United States Patent
Oku et al.

(10) Patent No.: US 9,924,104 B2
(45) Date of Patent: Mar. 20, 2018

(54) BACKGROUND-DIFFERENTIAL EXTRACTION DEVICE AND BACKGROUND-DIFFERENTIAL EXTRACTION METHOD

(71) Applicant: THE UNIVERSITY OF TOKYO, Bunkyo-ku, Tokyo (JP)

(72) Inventors: Hiromasa Oku, Tokyo (JP); Keiko Yokoyama, Tokyo (JP); Masatoshi Ishikawa, Tokyo (JP)

(73) Assignee: The University of Tokyo, Tokyo (JP)

(*) Notice: Subject to any disclaimer, the term of this patent is extended or adjusted under 35 U.S.C. 154(b) by 76 days.

(21) Appl. No.: 14/890,150

(22) PCT Filed: Apr. 28, 2014

(86) PCT No.: PCT/JP2014/061826
§ 371 (c)(1),
(2) Date: Nov. 9, 2015

(87) PCT Pub. No.: WO2014/181726
PCT Pub. Date: Nov. 13, 2014

(65) Prior Publication Data
US 2016/0088231 A1    Mar. 24, 2016

(30) Foreign Application Priority Data

May 9, 2013   (JP) .................................. 2013-099408

(51) Int. Cl.
*H04N 5/232*    (2006.01)
*G06K 9/46*    (2006.01)
(Continued)

(52) U.S. Cl.
CPC ....... *H04N 5/23296* (2013.01); *G06K 9/4609* (2013.01); *G06K 9/4652* (2013.01);
(Continued)

(58) Field of Classification Search
CPC .. H04N 5/23296; H04N 5/2259; H04N 5/232; H04N 2/2259; H04N 5/23216;
(Continued)

(56) References Cited

U.S. PATENT DOCUMENTS

| 2004/0247173 A1* | 12/2004 | Nielsen | G06T 3/0062 382/154 |
| 2007/0279494 A1* | 12/2007 | Aman | G01S 3/7864 348/169 |
| 2010/0033567 A1* | 2/2010 | Gupta | H04N 17/002 348/143 |

FOREIGN PATENT DOCUMENTS

| CN | 101216888 A | 7/2008 |
| JP | 10-21407 A | 1/1998 |

(Continued)

OTHER PUBLICATIONS

Written Opinion dated Aug. 5, 2014, issued in corresponding International Application No. PCT/JP2014/061826, filed Apr. 28, 2014, 4 pages.

(Continued)

*Primary Examiner* — Ahmed A Berhan
(74) *Attorney, Agent, or Firm* — Christensen O'Connor Johnson Kindness PLLC

(57) ABSTRACT

This invention provides a technology that allows the acquisition of background differentials using images acquired by a camera, the viewpoint of which moves. First, said camera acquires a background image, i.e. an image that does not contain a target object. Using information on the line-of-sight direction and viewpoint position of the camera, position information for pixels in the background image is transformed to polar-coordinate information Next, the camera acquires an object image. Using information on the line-of-sight direction and viewpoint position of the camera, position information for pixels in the object image is trans- (Continued)

formed to polar-coordinate information. The polar-coordinate information for the pixels in the object image is used to identify a target background, said target background being the part of the background image in an angle region corresponding to the object image. By comparing the object image and the target background, the differential therebetween is extracted.

9 Claims, 11 Drawing Sheets

(51) Int. Cl.
*H04N 5/225* (2006.01)
*G06T 7/20* (2017.01)
*G01S 3/786* (2006.01)
*G06T 7/11* (2017.01)
*G06T 7/174* (2017.01)
*G06T 7/194* (2017.01)

(52) U.S. Cl.
CPC ............... *G06T 7/11* (2017.01); *G06T 7/174* (2017.01); *G06T 7/194* (2017.01); *G06T 7/20* (2013.01); *H04N 5/2259* (2013.01); *G01S 3/7864* (2013.01); *G06T 2207/20224* (2013.01); *G06T 2207/30244* (2013.01); *H04N 5/23216* (2013.01)

(58) Field of Classification Search
CPC ... G06T 7/194; G06T 7/74; G06T 7/11; G06T 7/174; G06T 7/20; G06T 2207/20224; G06T 2207/30244; G06T 2207/30232; G06F 3/013; G06K 9/4609; G06K 9/4652; G01S 3/7864

USPC ....................... 348/143, 169, 208.12, 208.14
See application file for complete search history.

(56) References Cited

FOREIGN PATENT DOCUMENTS

| | | |
|---|---|---|
| JP | 2009-236569 A | 10/2009 |
| JP | 2010-244207 A | 10/2010 |
| WO | 2014/181726 A1 | 11/2014 |

OTHER PUBLICATIONS

Aloimonos, J., et al., "Active Vision," International Journal of Computer Vision 1(4):333-356, Jan. 1988.
International Search Report dated Aug. 5,2014, issued in corresponding International Application No. PCT/JP2014/061826, filed Apr. 28, 2014, 5 pages.
Okumura, K., et al., "High-Speed Gaze Controller for Millisecond-Order Pan/Tilt Camera," Proceedings of the IEEE International Conference on Robotics and Automation (ICRA), Shanghai, May 9-13, 2011, pp. 6186-6191.
Wada, T., and T. Matsuyama, "Appearance Sphere: Background Model for Pan-Tilt-Zoom Camera," Proceedings of the 13th International Conference on Pattern Recognition (ICPR '96), Vienna, Aug. 25-29, 1996, pp. 718-722.
Yachi, K., et al., "Human Head Tracking Using Adaptive Appearance Model With a Fixed-Viewpoint Pan-Tilt-Zoom Camera," Proceedings of the 4th IEEE International Conference on Automatic Face and Gesture Recognition, Grenoble, France, Mar. 28-30, 2000, pp. 150-155.
Office Action dated Nov. 16, 2017, issued in corresponding Chinese Application No. 201480025487.7, filed Apr. 28, 2014, 10 pages.

* cited by examiner

FIG. 7
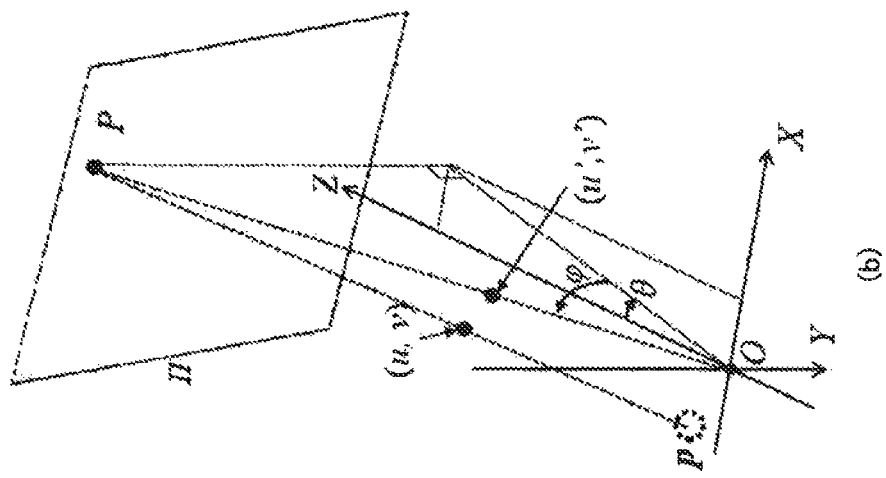
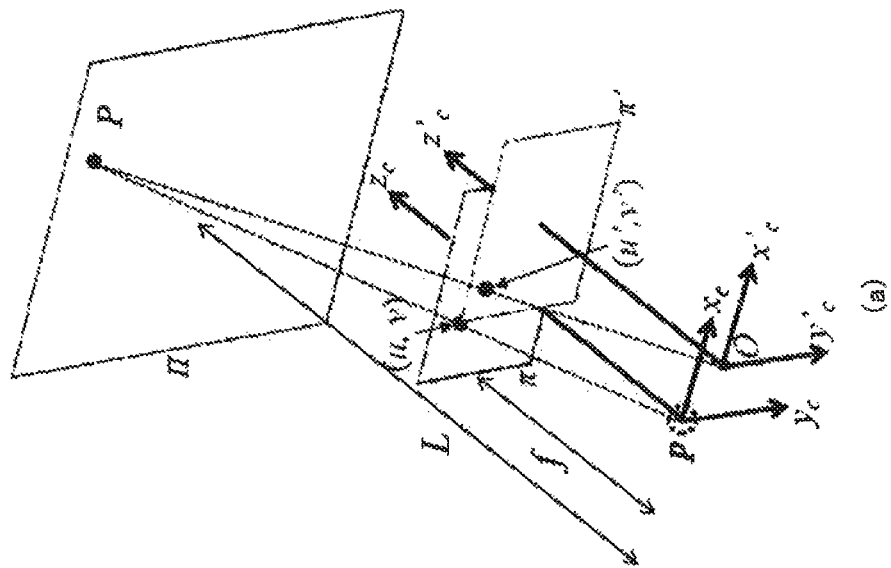

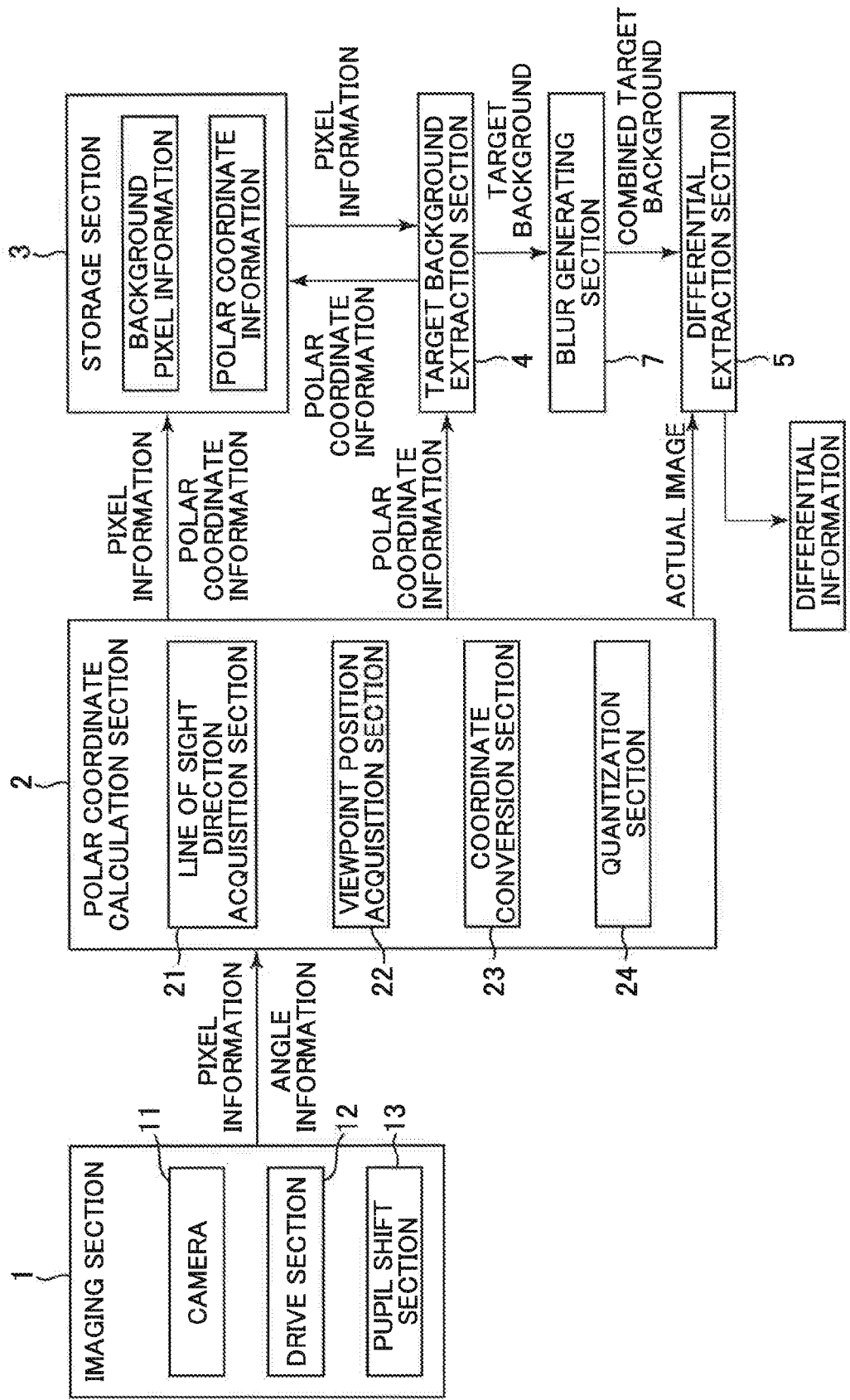

BACKGROUND-DIFFERENTIAL EXTRACTION DEVICE AND BACKGROUND-DIFFERENTIAL EXTRACTION METHOD

TECHNICAL FIELD

The present invention relates to technology for extracting a background differential by comparing corresponding image data with each other.

BACKGROUND ART

In order to continuously shoot a subject, it is necessary to have a camera line of sight trained on the subject. This task is often undertaken manually by the photographer, but it is difficult to perfectly track something like the bouncing of a ball that is high speed and has irregular movement. For this reason, research into systems for automatically controlling line of sight direction of a camera mechanically (so-called Active Vision; refer to non-patent publication 1 below) has become widespread in many fields.

With normal Active Vision technology, since the camera itself is moved while being attached to a drive platform, there is a delay in response speed with respect to movement in the line of sight direction. This makes tracking of a moving object that includes sudden speed changes (for example, a ball being used in a ball game) difficult. If the fact that the frame rate of a high speed camera reaches 1,000,000 fps in faster applications, and actual conditions where image processing is carried out at high speed by GPUs, are considered, it can be said that line of sight control speed is a bottleneck with respect to speed in various tracking systems.

In order to solve this problem, an optical system known as a Saccade Mirror has been proposed, to carry out change of the line of sight of a camera at high speed using small drive mirrors arranged in front of a camera (refer to non-patent publication 2 below). With this technology, using two axis galvanometer mirrors makes high speed line of sight change possible. Regarding a control system, if it were possible to control line of sight so as to always keep a physical object in the center of the screen, can be considered that unprecedented dynamic shooting would become possible.

However, in tracking a physical subject, it is necessary to extract the physical object from within an image, and train the line of sight of the camera towards this physical object. As a method for extracting a physical object from within an image, there are, for example:

(1) a method of, after extracting a feature amount from within an image, identifying a physical object within the image by comparing with learned data that has been acquired by learning beforehand; and (2) a method of acquiring a background image in advance, and identifying a physical object by comparing with an image (actual image) containing the physical object (the so-called background differencing method).

The method in (1) above has an advantage in that it is not necessary to acquire a background image, but since image processing time becomes long, it is ill suited to physical object identification in real time. Also, although this method depends of the content of learned data, it also tends to be inadequate in terms of accuracy of identifying a physical object.

The background differencing method of (2) above has the advantage that high-speed physical object identification is possible. However, with background differencing methods that have been proposed conventionally (refer, for example, to non-patent publications 3 and 4 below), it is assumed that an image has been acquired using a fixed viewpoint camera. It is considered difficult to directly apply these techniques to a camera in which viewpoint moves.

CITATION LIST

Non-Patent Literature

[Non-patent Publication 1]
J. Aloimonos, I. Weiss and A. Bandyopadhyay: "Active Vision", Int'l Journal of Computer Vision, vol. 1, no. 4, pp. 333.356 (1988).
[Non-patent Publication 2]
K. Okumura, H. Oku and M. Ishikawa: "High-Speed Gaze Controller for Millisecond-order Pan/tilt Camera", Proc. of IEEE Int'l Conf. on Robotics and Automation, pp. 6186. 6191 (2011).
[Non-patent Publication 3]
T. Wada and T. Matsuyama: "Appearance Sphere: Background model for pan-tilt-zoom camera", Proc. of 13th Int'l Conf. of Pattern Recognition, pp. A718.722 (1996).
[Non-patent Publication 4]
K. Yachi, T. Wada and T. Matsuyama: "Human Head Tracking using Adaptive Appearance Model with a Fixed-viewpoint Pan-tilt-zoom Camera", Proc. of IEEE Intl' Conf. on Automatic Face and Gesture Recognition, pp. 150.155 (2000).

SUMMARY OF THE INVENTION

Technical Problem

The present invention has been conceived in view of the above-described situation. An object of the present invention is to provide a technique that makes it possible to acquire a background differential using an image that has been acquired with a camera in which viewpoint is moved.

Solution to Problem

Means for solving the above-described problems can be described as in the following aspects.
(Aspect 1)
A background differential extraction device, for extracting background differentials using images that have been acquired by a camera whose line of sight direction and viewpoint position are movable, comprising:
an imaging section, a polar coordinate calculation section, a storage section, a target background extraction section, and a differential extraction section, wherein
the imaging section is provided with a camera and a drive section,
the camera is capable of acquiring a background image, being an image that does not contain a physical object, or an actual image, being an image containing a physical object,
the drive section is capable of changing line of sight direction and viewpoint position of the camera,
the polar coordinate calculation section further comprises a line of sight direction acquisition section, a viewpoint position acquisition section, and a coordinate conversion section,
the line of sight direction acquisition section acquires a line of sight direction of the camera, the viewpoint position acquisition section acquires a viewpoint position of the camera, the coordinate conversion section converts positional information of pixels of the background image or the actual image to polar coordinate information of a fixed coordinate system, using the line of sight direction and viewpoint position that have been acquired, the storage section stores a correspondence relationships between color information of pixels of the background image and polar coordinate information of the pixel, the target background extraction section identifies the background image, in an angle region corresponding to the actual image, as a target background, using polar coordinate information of pixels of the actual image, and the differential extraction section extracts differentials between the actual image and the target background by comparing the actual image and the target background.

(Aspect 2)

The background differential extraction device of aspect 1, wherein the conversion to the polar coordinate information by the coordinate conversion section comprises:

processing to convert positional information of pixels of the background image or the actual image to virtual position information, being positional information of said pixels on a virtual image of a virtual camera whose viewpoint is fixed, and processing to convert the virtual positional information to polar coordinate information of the fixed coordinate system.

(Aspect 3)

The background differential extraction device of aspects 1 or 2, further comprising a quantization section, and wherein the quantization section quantizes the polar coordinate information that has been acquired by the coordinate conversion section, and the quantization section also increases an angular range as quantization units as the line of sight direction of the camera deviates from a reference direction of the fixed coordinate system, and the storage section uses the polar coordinate information that has been quantized as polar coordinate information of the pixels.

(Aspect 4)

The background differential extraction device of any one of aspects 1 to 3, further comprising a blur generating section, and wherein the blur generating section generates a combined target background that has blur by specifying a plurality of the target backgrounds along a direction in which the line of sight direction moves, and combining the specified plurality of target backgrounds, and the differential extraction section extracts the differentials by comparing the actual image and the combined target background.

(Aspect 5)

The background differential extraction device of any one of aspects 1 to 4, wherein the line of sight direction of the camera is represented by a pan direction angle and a tilt direction angle.

(Aspect 6)

The background differential extraction device of any one of aspects 1 to 5, wherein the drive section is provided with a specular optical system that changes the line of sight direction of the camera to a pan direction and a tilt direction.

(Aspect 7)

The background differential extraction device of any one of aspects 1 to 6, further provided with a background update section, and wherein the background update section specifies a portion within the actual image, where the differential has not been extracted by the differential extraction section, as a new background image, and updates color information of pixels of the background image stored in the storage section.

(Aspect 8)

The background differential extraction device of any one of aspects 1 to 7, wherein the drive section directs the line of sight direction of the camera towards the portion that has been extracted as a differential by the differential extraction section.

(Aspect 9)

A background differential extraction method, for extracting background differentials using images that have been acquired by a camera whose line of sight direction and viewpoint position are movable, comprising:

a step of acquiring a background image, being an image that does not contain a physical object, using the camera, a step of converting positional information of pixels of the background image to polar coordinate information of the fixed coordinate system, using information on the line of sight direction and the viewpoint position of the camera, a step of storing correspondence relationships between color information of pixels of the background image and polar coordinate information of the pixels in a storage section, a step of acquiring an actual image, being an image that contains a physical object, using the camera, a step of converting positional information of pixels of the actual image to polar coordinate information of the fixed coordinate system, using information on the line of sight direction and the viewpoint position of the camera, a step of identifying the background image, in an angle region corresponding to the actual image, as a target background, using polar coordinate information of pixels of the actual image, and a step of extracting differentials between the actual image and the target background by comparing the actual image and the target background.

(Aspect 10)

A computer program, for extracting background differentials using images that have been acquired by a camera whose line of sight direction and viewpoint position moves, the computer program causing a computer to execute:

a step of acquiring a background image, being an image that does not contain a physical object, in the camera, a step of converting positional information of pixels of the background image to polar coordinate information of the fixed coordinate system, using information on the line of sight direction and the viewpoint position of the camera, a step of storing correspondence relationships between color information of pixels of the background image and polar coordinate information of the pixels in a storage section, a step of acquiring an actual image, being an image that contains a physical object, in the camera, a step of converting positional information of pixels of the actual image to polar coordinate information of the fixed coordinate system, using information on the line of sight direction and the viewpoint position of the camera, a step of identifying the background image, in an angle region corresponding to the actual image, as a target background, using polar coordinate information of pixels of the actual image, and a step of extracting differentials between the actual image and the target background by comparing the actual image and the target background.

This computer program can be stored in a suitable storage medium (for example, an optical storage medium such as CD-ROM or DVD disc, electromagnetic storage medium such as a hard disk or flexible disk, or a magnetooptical storage medium such as MO disk). This computer program can also be transmitted by means of a communication network such as the Internet.

Advantageous Effect of the Invention

According to the present invention, it becomes possible to acquire a background differential using an image that has been acquired with a camera whose viewpoint moves. Accordingly, it becomes possible to regard the acquired background differential as a physical object, and to thereby carry out line of sight control of the camera in order to track this physical object.

BRIEF DESCRIPTION OF THE DRAWINGS

FIG. 7 is an explanatory drawing of a coordinate system and pixel position providing a basis for explanation of the coordinate conversion sequence, with FIG. 7(a) being an explanatory drawing of a virtual camera coordinate system, and FIG. 7(b) being an explanatory drawings of pan angle and tilt angle of a fixed coordinate system.

FIG. 11 is a block diagram showing the schematic structure of a background differential extraction device of a second embodiment of the present invention.

DESCRIPTION OF THE EMBODIMENTS

A background differential extraction device of a first embodiment of the present invention will be described in the following with reference to the attached drawings. The device of this embodiment is used in a physical object tracking system, which will describe later.
(Structure of the First Embodiment)

Figure 1:
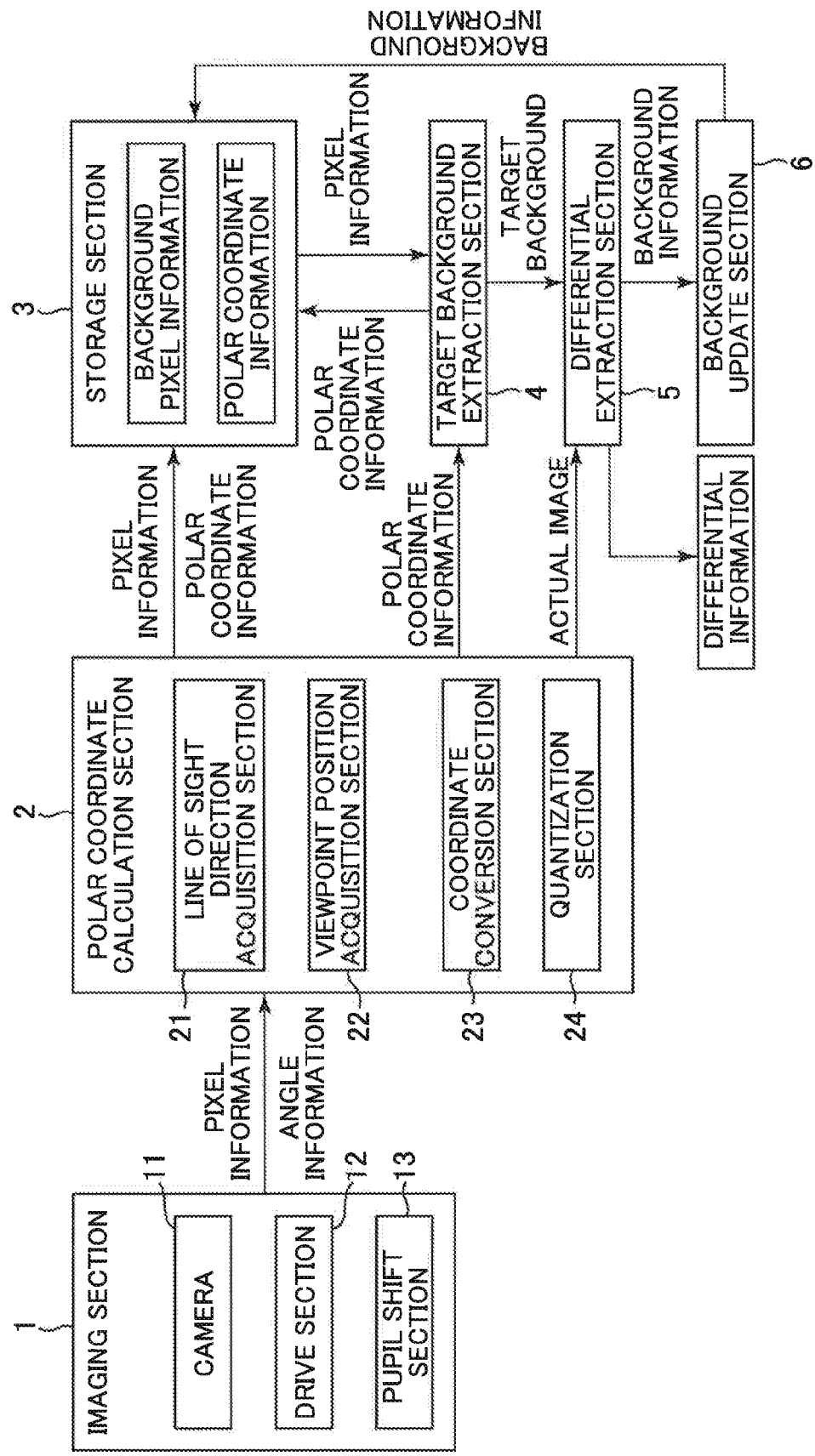
FIG. 1 is a block diagram showing the schematic structure of a background differential extraction device of a first embodiment of the present invention.

As shown in FIG. 1, the background differential extraction device of this embodiment comprises an imaging section 1, a polar coordinate calculation section 2, a storage section 3, a target background extraction section 4 and a differential extraction section 5. This device further comprises a background update section 6.

Figure 2:
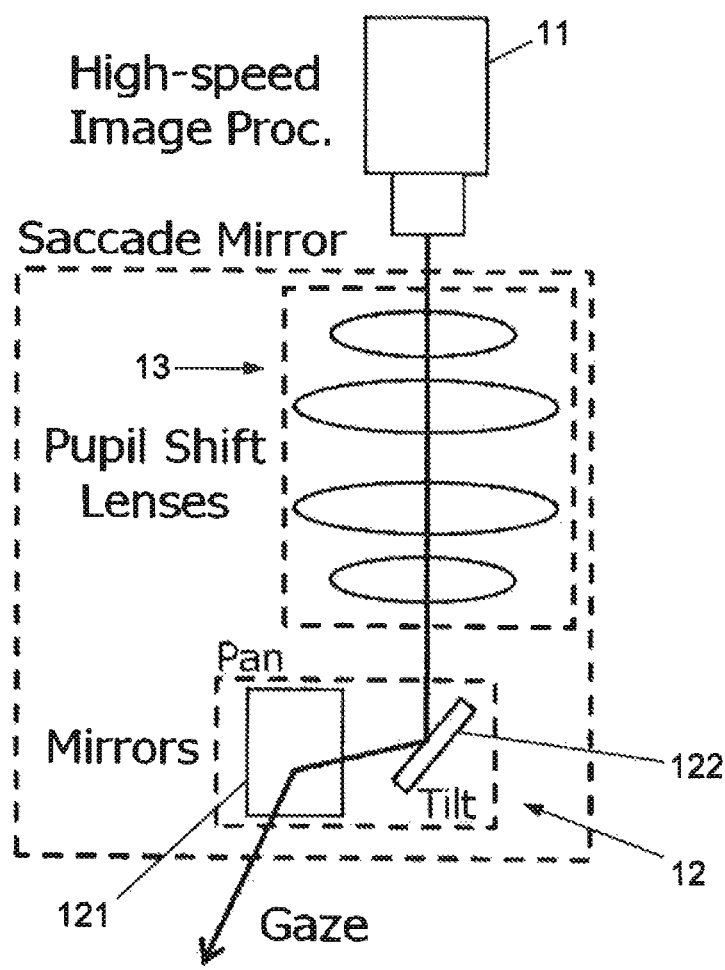
FIG. 2 is an explanatory drawing showing a specific structural example of an imaging section.

The imaging section 1 is provided with a camera 11 and a drive section 12. The imaging section 1 is further provided with a pupil shift section 13. A specific structural example of the imaging section 1 is shown in FIG. 2.

The camera 11 acquires images at an appropriate frame rate for tracking a physical object. For example, in a case where a physical object moves at high speed, it is possible to use a camera that acquires digital images at a cycle of 1 ms per frame, but this is merely an example, and a different frame rate may be used in accordance with intended usage. The number of pixels of the camera 11 can be determined depending on the object of tracking, but in principle is not particularly limited. The line of sight direction of the camera 11 is shown by an arrow in FIG. 2. As will be described later, the camera 11 is capable of acquiring a background image, being an image that does not contain a physical object, or an actual image, being an image containing a physical object. Specifically, the camera 11 shoots a background image at the time of registering background image information, and shoots an actual image (image containing a physical object) when tracking the physical object. Obviously, with this embodiment it is also possible to separately provide a camera for background image shooting and a camera for actual image shooting. The camera 11 is not limited to a visible light camera, and may also be a camera for shooting electromagnetic waves (including terahertz waves or millimeter waves) of infrared light or another wavelength region. Basically, the camera 11 may be any camera that can acquire digital images, and may also be a so-called rangefinder. The camera 11 may also be a camera for shooting light of a single wavelength (monochrome camera). In this case, pixel values of an acquired image only comprise brightness values. In this specification, brightness value itself of a pixel can also be applied to an example of "color information of a pixel".

The drive section 12 is provided with a specular optical system that changes the line of sight direction of the camera 11 into a pan direction and a tilt direction. In more detail, as shown in FIG. 2, the drive section 12 is provided with a pan mirror 121 and a tilt mirror 122. Both the pan mirror 121 and the tilt mirror 122 can be respectively rotated in the pan direction or the tilt direction by drive means, not shown, such as a control motor, for example, with a specified axis as a center. Also, with this embodiment it is possible to control pan angle and tilt angle using a control section, not shown. Further, with this embodiment, it is possible to acquire actual pan angle and tilt angle and feedback these angles to a control section side.

As will be described later, position of a pupil (namely viewpoint position) that has been shifted by the pupil shift section 13 is varied in accordance with change in pan angle or tilt angle. In this way the drive section 12 can change the line of sight direction and viewpoint position of the camera 11. In this specification, the line of sight direction of the camera 11 is represented by the pan direction angle and the tilt direction angle.

Further, the drive section 12 of this embodiment is controlled by a control section, not shown, so that the line of sight direction of the camera 11 is trained on a section that has been extracted as a differential by the differential extraction section 5.

The pupil shift section 13 is constituted by a pupil shift optical system, as shown in FIG. 2. The pupil shift section 13 shifts the pupil position of the camera 11 between the pan mirror 121 and the tilt mirror 122.

The polar coordinate calculation section 2 is provided with a line of sight direction acquisition section 21, a viewpoint position acquisition section 22 and a coordinate conversion section 23. The polar coordinate calculation section 2 of this embodiment is also provided with a quantization section 24.

The line of sight direction acquisition section 21 acquires line of sight direction of the camera 11. More specifically, the line of sight direction acquisition section 21 acquires information on inclination angle of the pan mirror 121 and the tilt mirror 122 (actual angle is preferred, but a control instruction value may also be used) of the drive section 12 from the imaging section 1 (or a control section, not shown), and calculates line of sight direction.

The viewpoint position acquisition section 22 acquires viewpoint position of the camera 11. Specifically, the viewpoint position acquisition section 22, similarly to the line of sight direction acquisition section 21, acquires inclination angle of the pan mirror 121 and the tilt mirror 122 of the drive section 12 from the imaging section 1 and calculates viewpoint position.

The coordinate conversion section 23 converts positional information of pixels of a background image or an actual image to polar coordinate information of a fixed coordinate system (so-called world coordinate system) using the line of sight direction and viewpoint position that have been acquired.

With this embodiment, conversion to polar coordinate information by the coordinate conversion section 23 is executed using (1) processing to convert positional information of pixels of a background image or an actual image to virtual position information, being positional information of said pixels on a virtual image of a virtual camera whose viewpoint is fixed, and (2) processing to convert the virtual positional information to polar coordinate information of the fixed coordinate system.

The quantization section 24 quantizes the polar coordinate information that has been acquired by the coordinate conversion section 23. The quantization section 24 also increases an angular range as quantization units the more the line of sight direction of the camera 11 deviates from a reference direction in the fixed coordinate system.

Detailed processing in the polar coordinate calculation section 2 will be described in detail later in the description of the operation of this embodiment. The polar coordinate calculation section 2 can be constituted by, for example, a combination of computer hardware and software.

The storage section 3 stores correspondence relationships between color information of pixels of the background image and polar coordinate information of the pixels. The storage section 3 of this embodiment uses polar coordinate information that has been quantized by the quantization section 24 as polar coordinate information of the pixels to be stored in this storage section 3.

The storage section 3 is a volatile or non-volatile memory that can be used with a computer, but is not limited to any specific storage medium. The storage section 3 may also be a storage device that can be used by a computer via a network. The color space of the pixels is not particularly limited, and it is possible to use an appropriate color space as required, such as RGB or HSV. Also, color space may be brightness information only, or, as required, may be only color information besides brightness information.

The target background extraction section 4 specifies a background image in an angular region corresponding to the actual image as a target background, using polar coordinate information of pixels of the actual image.

The differential extraction section 5 extracts differentials between the actual image and the target background by comparing the actual image and the target background.

The background update section 6 specifies a portion within the actual image, where the differential has not been extracted by the differential extraction section 5, as a new background image, and updates color information of pixels of the background image in the storage section 3.

Further specific structure of the background differential extraction device of this embodiment will be described in detail later, in the description of operation which will be given later.

(Operation of the First Embodiment)

Figure 3:
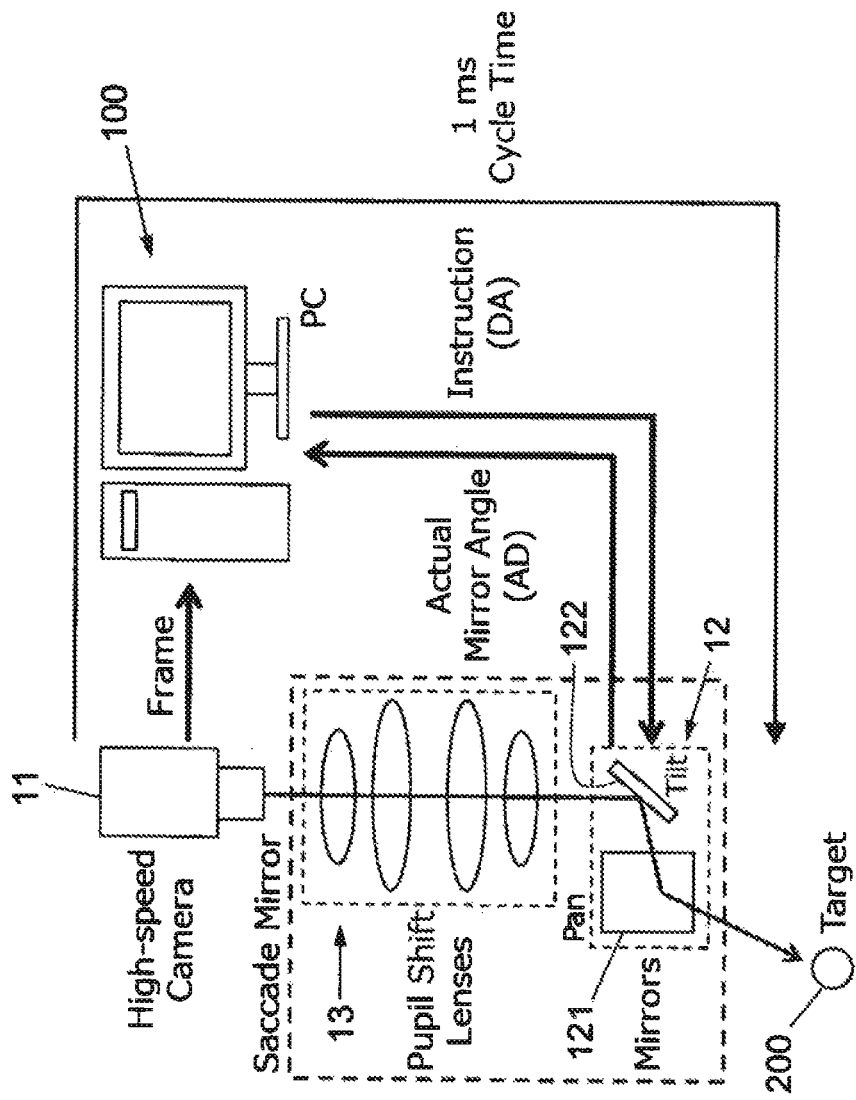
FIG. 3 is a schematic explanatory drawing of a tracking system including the device of FIG. 1.

Operation of the background differential extraction device of this embodiment will be described in the following. As a premise for the following description, the overall structure of a tracking system into which the background differential extraction device of this embodiment is incorporated will be described using FIG. 3. This tracking system is provided with a computer 100, and the functions of the polar coordinate calculation section 2, storage section 3, target background extraction section 4, differential extraction section 5 and background update section 6 are implemented by this computer 100 (specifically, a combination of hardware and software). Also, inclination angle (pan angle and tilt angle) of the pan mirror 121 and the tilt mirror 122 are controlled by transmitting control instructions from a control section (not shown) of the computer 100 to the drive section 12, making it possible to align (namely track) line of sight on a tracked physical object 200. Further, with this device, actual inclination angle of the pan mirror 121 and the tilt mirror 122 are acquired using sensors (not shown), and returned to the computer 100, so that these inclination angles can be used by the polar coordinate calculation section 2, for example.

In the following, a background differential extraction method of this example will be described with reference to the flowchart of FIG. 4.

Figure 4:
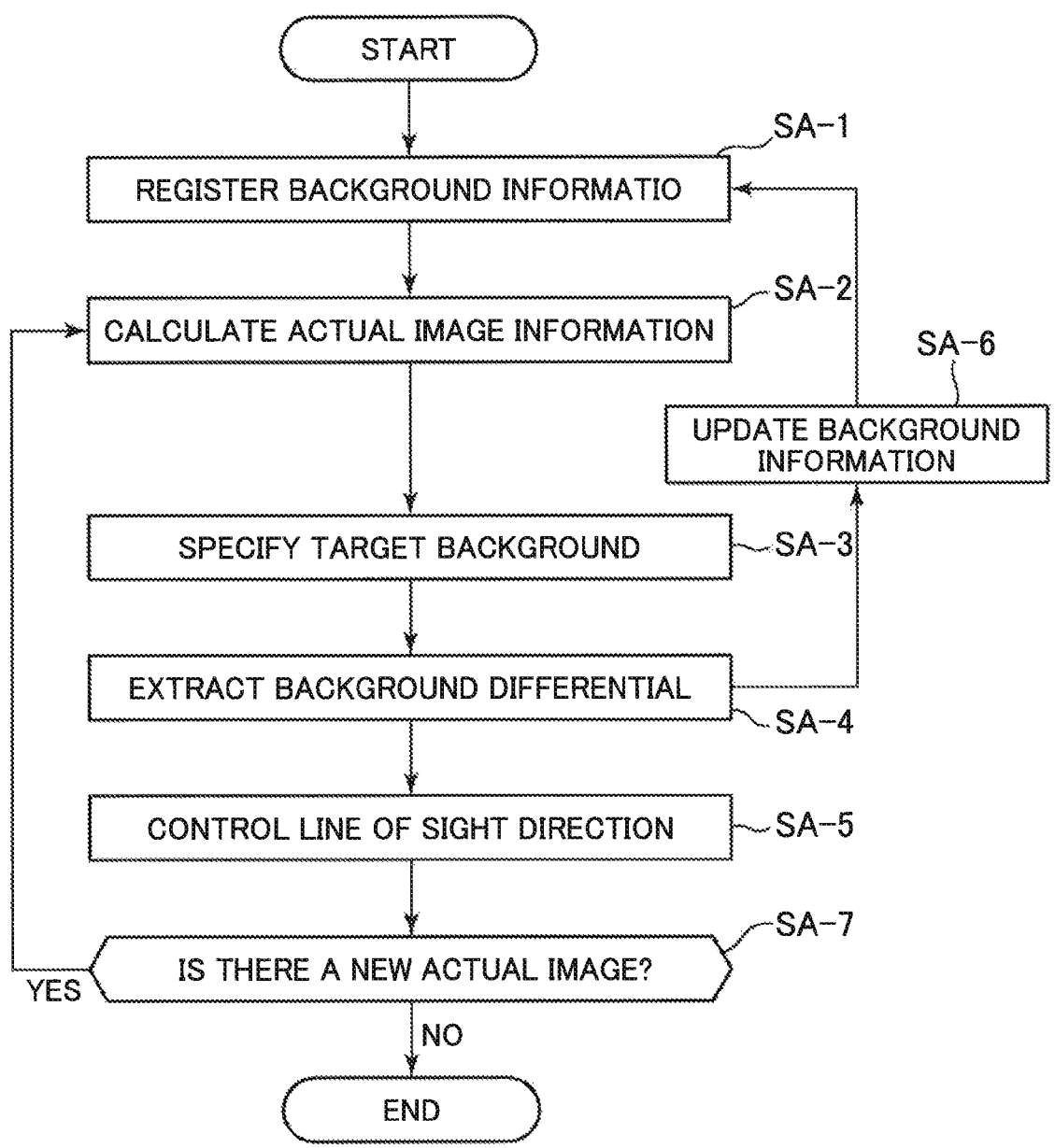
FIG. 4 is a flowchart showing the schematic sequence of a background differential extraction method that uses the device of FIG. 1.

(Step SA-1 in FIG. 4)

With the background differential extraction method of this embodiment, the first processing for registering a background image, being an image that does not contain a physical object, is carried out. A specific example of background image registration processing will be described in detail with reference to FIG. 5.

Figure 5:
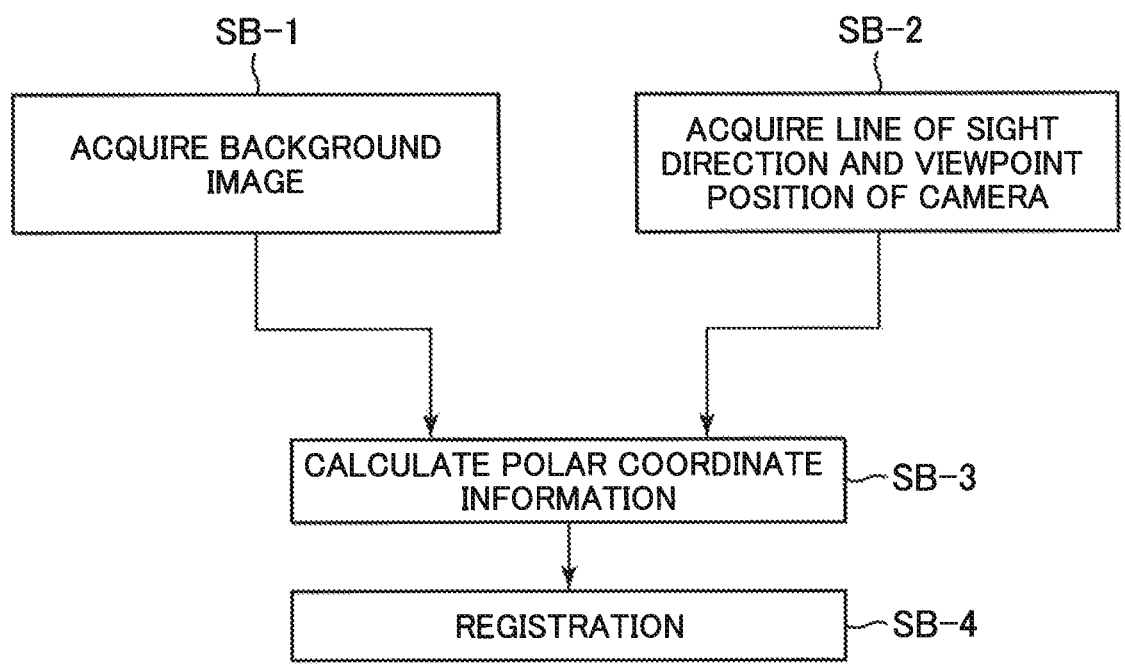
FIG. 5 is a flowchart showing a sequence for registering background information.

(Step SB-1 in FIG. 5)

First, a background image is acquired from the camera 11. Here, with this embodiment, an image of a background for all regions that can be acquired by the camera 11 (in this specification referred to as "complete background image") is acquired. Specifically, with this embodiment, since it is possible to change line of sight direction of the camera 11 using the drive section 12, a complete background image that is capable of being acquired by the camera 11 is acquired in accordance with the maximum variable range of the line of sight direction. However, it is not necessary to acquire the complete background image all at once, and it is also possible to carry out subsequent polar coordinate calculation processing and registration processing for each background image that has been taken at a specified angle of view. Naturally it is also possible to carry out subsequent processing after having acquired a complete background image. Also, if subsequent background differential extraction processing is used, since it is only necessary to acquire the complete background image in a predicted angular range (or line of sight direction range), there is no need to acquire a background image corresponding to the entire line of sight direction range. Information on the acquired background image (pixel information and pixel position information on the image) is sent to the coordinate conversion section 23. (Step SB-2 in FIG. 5)

On the other hand, actual inclination angles of the pan mirror 121 and the tilt mirror 122 (at the time of background image acquisition) are transmitted from the drive section 12 to the line of sight direction acquisition section 21 and the viewpoint position acquisition section 22. Line of sight direction and viewpoint position are calculated by the line of sight direction acquisition section 21 and the viewpoint position acquisition section 22 using the inclination angle information for the pan mirror 121 and the tilt mirror 122. In this calculation, instead of actual inclination angle of the pan mirror 121 and the tilt mirror 122, it is also possible to use instruction values for inclination angle that are sent to the pan mirror 121 and the tilt mirror 122. However, an improvement in tracking accuracy it can be expected by using actual inclination angles. A calculation method for line of sight direction and viewpoint position in the line of sight direction acquisition section 21 and the viewpoint position acquisition section 22 using the inclination angle information for the pan mirror 121 and the tilt mirror 122 will be described in the following.

(Calculation of Line of Sight Direction and Viewpoint Position)

Figure 6:
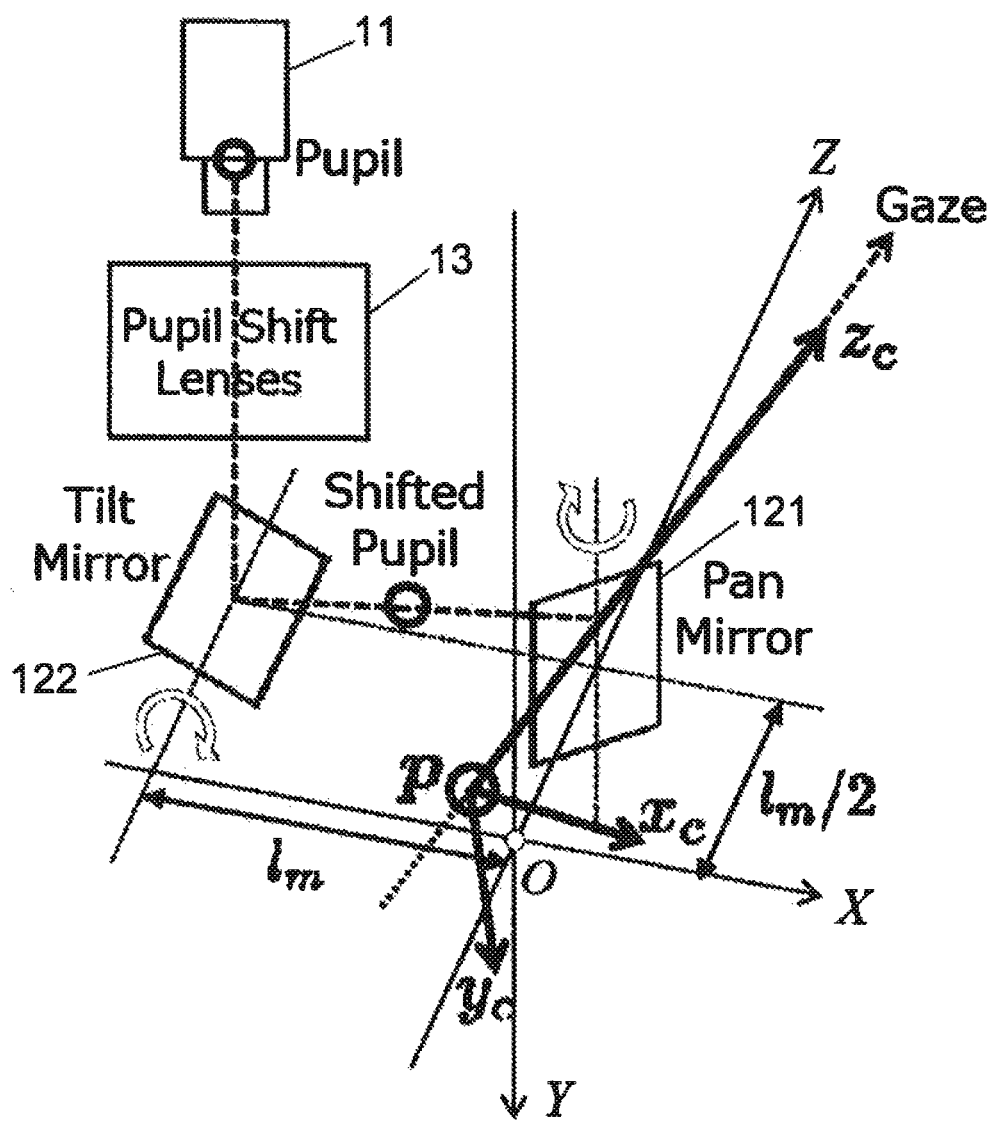
FIG. 6 is an explanatory drawing of a coordinate system and viewpoint position providing a basis for an explanation of a coordinate conversion sequence.

Positional relationships of the camera 11, pan mirror 121 and tilt mirror 122 in a fixed coordinate system (also called world coordinates) are shown in FIG. 6. As mentioned previously, line of sight direction of the camera 11 can be controlled using the pan mirror 121 and the tilt mirror 122. Also, pupil position of the camera 11 is optically shifted to a midpoint of these two mirrors by the pupil shift section 13. In this way it is possible to miniaturize the drive section 12 while maintaining a sufficient angle of view, and high speed line of sight direction control also becomes possible. The pupil that has been shifted between the pan mirror 121 and the tilt mirror 122 by the pupil shift section 13 appears at a position shown by reference symbol p in FIG. 6 if viewed from a physical object (that is, a position constituting a mirror image of the pupil by the pan mirror 121). This position is optically equivalent to the viewpoint position of the camera 11, and so will be treated as viewpoint in the following description. Also, camera coordinates with viewpoint as an origin and line of sight direction trained on a physical object made a $z_c$ axis are defined as $(x_c, y_c, z_c)$ (refer to FIG. 6). Conversion between the camera coordinates $(x_c, y_c, z_c)$ and fixed coordinates $(X, Y, Z)$ can be expressed by equation (1) below.

$$\begin{pmatrix} x_c \\ y_c \\ z_c \end{pmatrix} = R\left[\begin{pmatrix} X \\ Y \\ Z \end{pmatrix} - p\right] \quad (1)$$

Here, for ease of computation, a center to center distance between the two mirrors 121 and 122 is made $l_m$, and a shift destination of the pupil of the camera 11 by the pupil shift section 13 is made a position where a distance on the optical axis from the tilt mirror 122 become $l_m/2$ (refer to FIG. 6). Further, camera coordinates in a case where a plane formed by the camera 11 and the pan and tilt mirrors 121 and 122 (more specifically, a plane passing through the three points of the original viewpoint position of the camera 11 and the center points of the two mirrors) and a $z_c$ axis on the camera coordinate system intersect coincide with world coordinates.

When the line of sight has been rotated by $\theta_c$ and $\varphi_c$ respectively in the pan and tilt directions (amounts of rotation of the plan and tilt mirrors at this time are respectively $\theta_c/2$ and $\varphi_c/2$) conversion between the two coordinate systems is represented in a similar form to previously described equation (1). Here, using a rotation matrix $R_t R_p$ for line of sight using the pan mirror and the tilt mirror, R can be written as:

$$R = R_t R_p \quad (2)$$

Here, each rotation matrix $R_t, R_p$ is represented as follows.

$$R_p = \begin{pmatrix} \cos\theta_c & 0 & -\sin\theta_c \\ 0 & 1 & 0 \\ \sin\theta_c & 0 & \cos\theta_c \end{pmatrix}, R_t = \begin{pmatrix} 1 & 0 & 0 \\ 0 & \cos\phi_c & -\sin\phi_c \\ 0 & \sin\phi_c & \cos\phi_c \end{pmatrix}$$

Also, the previously described viewpoint position p can be written as follows.

$$p(\theta_c, \phi_c) = \frac{l_m}{2}\begin{pmatrix} -\sin\theta_c(2-\cos\phi_c) \\ -\sin\phi_c \\ 1-\cos\theta_c(2-\cos\phi_c) \end{pmatrix} \quad (3)$$

Accordingly, using this computation, viewpoint position can be calculated by the viewpoint position acquisition section 22 from information on the inclination angles of the pan mirror 121 and the tilt mirror 122 (namely, line of sight directions of the camera $\theta_c$ and $\varphi_c$). That is, as was described earlier, position of a pupil (viewpoint position) that has been shifted by the pupil shift section 13 is varied in accordance with change in pan angle or tilt angle. The line of sight direction acquisition section 21 can easily acquire line of sight direction of the camera 11 (namely $\theta_c$ and $\varphi_c$) using rotation angles of the pan and tilt mirrors.

(Step SB-3 in FIG. 5)

Next, the coordinate conversion section 23 converts position information of pixels of the background image to polar coordinate information of a fixed coordinate system (X, Y, Z) using information on line of sight direction and viewpoint position of the camera 11 (namely $\theta_c$ and $\varphi_c$). One example of this conversion procedure will be described in the following.

(Calculation of Polar Coordinate Information)

As a prerequisite, focal length of the camera 11 is made f, and an image plane is made π. Also, as shown in FIG. 7(a), in a case where a translation component of viewpoint movement has been assumed as 0, the camera coordinate system below (hereafter referred to as "virtual camera coordinate system") is considered.

$$\begin{pmatrix} x'_c \\ y'_c \\ z'_c \end{pmatrix} = R\begin{pmatrix} X \\ Y \\ Z \end{pmatrix} = \begin{pmatrix} x_c \\ y_c \\ z_c \end{pmatrix} + Rp \quad (4)$$

An image plane corresponding to this virtual camera coordinate system (which may be likened to a virtual image on a virtual camera) is made π'. A point on the background is made P, and a plane that is parallel to planes π and π' passing through point P is made Π (refer to FIG. 7(a)).

Figure 8:
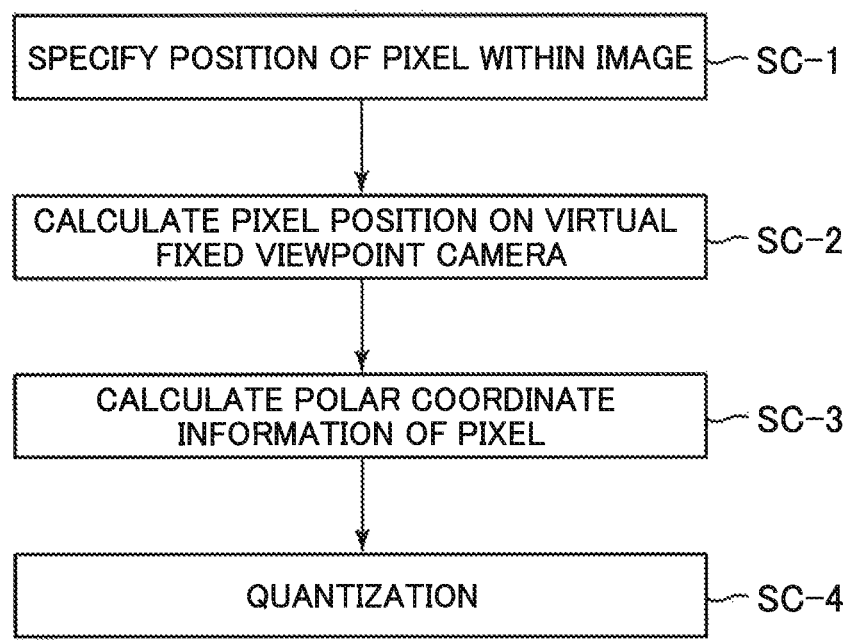
FIG. 8 is a flowchart showing a sequence for calculating polar coordinates.

(Steps SC-1 to SC-2 in FIG. 8)

A polar coordinate calculation procedure will be described in the following with reference to the flowchart of FIG. 8. A point where point P is projected onto the plane π is made (u, v), and a point where point P is projected onto the plane π' is made (u', v'). However, the origins of (u, v) and (u', v') respectively lie on $z_c$ and $z'_c$. If L is made a distance from viewpoint p to the plane Π, then since $|z'_c - z_c|$ can be considered sufficiently small compared to L, from pixel position (u, v) on the image π, pixel position (u', v') on the virtual plane π' can be approximately derived as follows.

$$\begin{pmatrix} u' \\ v' \end{pmatrix} = \frac{f}{L + (z'_c - z_c)} \begin{pmatrix} x'_c \\ y'_c \end{pmatrix} \quad (5)$$

$$= \frac{f}{L}\begin{pmatrix} x_c \\ y_c \end{pmatrix} + \left[ \frac{f}{L + (z'_c - z_c)}\begin{pmatrix} x'_c \\ y'_c \end{pmatrix} - \frac{f}{L}\begin{pmatrix} x_c \\ y_c \end{pmatrix} \right]$$

$$\simeq \begin{pmatrix} u \\ v \end{pmatrix} + \frac{f}{L}\left[ \begin{pmatrix} x'_c \\ y'_c \end{pmatrix} - \begin{pmatrix} x_c \\ y_c \end{pmatrix} \right]$$

(Step SC-3 in FIG. 8)

If point (u' v') that has been calculated in this way is used, polar coordinate expression angles (θ, φ) for point P in the XYZ fixed coordinate system will be represented as follows (FIG. 7 (b)).

$$\theta = \theta_c + \tan^{-1}\left(\frac{u'}{f\cos\phi}\right), \phi = \phi_c + \tan^{-1}\left(\frac{v'}{f}\right) \quad (6)$$

From the above, given that distance L is already known, using equations (5) and (6) pixel positions (u, v) for a camera image that has been acquired at an arbitrary line of sight are represented by polar coordinate angles (θ,φ). In the following, there is no problem as long as L is known, and under specified conditions there will not be a problem even if L is not already known. In the following supplemental description will be given of handling a translation component.

(Handling of Translation Component)

A translation component represented by the second right side term in equation (5) is small enough to be disregarded in the case where distance L is sufficiently large. That is, in the event that the background is sufficiently far away, viewpoint movement does not become a problem. Specifically, if distance L satisfies the following conditions, displacement of pixels accompanying translation is within subpixel units.

$$L > L_{threshold} = \quad (7)$$

$$\frac{l_m}{4}\max\left[\frac{w}{\tan(\gamma_w/2)}\max(x'_c - x_c), \frac{h}{\tan(\gamma_h/2)}\max(y'_c - y_c)\right]$$

Here, w and h in this equation represent numbers of horizontal and vertical pixels of the image, while $\gamma_w$ and $\gamma_h$ respectively represent horizontal and vertical angle of view.

On the other hand, in a case where the distance to the background is so small that translation cannot be ignored, in order to calculate the distance L as being already known it is possible to use weak perspective projection (Reference Literature: J. Aloimonos: "Perspective approximations", Image and Vision Computing, vol. 8, no. 3, pp. 179.192 (1990).). With weak perspective projection, the whole of an object is orthographically projected once onto a plane of the distance L. In other words, the whole of an object is assumed to be on a plane of distance L. At this time, in order for an error due to this assumption to be of sub-pixel units, conditions actual distance L should satisfy are as follows.

$$|\bar{L} - L| < \frac{\bar{L}L}{L_{threshold}} \Leftrightarrow \frac{\bar{L}L_{threshold}}{L_{threshold} + \bar{L}} < L < \frac{\bar{L}L_{threshold}}{L_{threshold} - \bar{L}} \quad (8)$$

In this way, it is possible to acquire polar coordinate information for each pixel of the background image. Since the previously described processing can be carried out in the same way for all the background images, it is possible to acquire polar coordinate information for the complete background image.

(Step SC-4 in FIG. 8)

Next, with this embodiment the quantization section 24 carries out processing to quantize the polar coordinate information that was acquired by the coordinate conversion section 23. Here, the quantization section 24 carries out quantization so as to increase an angle range, in quantization units, to such an extent that line of sight direction of the camera 11 moves away from a reference direction (the Z axis direction in this example) of the fixed coordinate system. A specific example of quantization processing will be described in the following.

(Quantization Processing)

Since, in reality, background information is acquired as discrete pixel values, and not continuously, there is a possibility of density deviation arising in data that has been registered on the polar coordinates. That is, even with the same angular width on the polar coordinates, information amount to be dealt with (number of pixels) will differ depending on the magnitude of the pan angle or the tilt angle. If unit variations for (u, v) corresponding to a single pixel are made Δu and Δv, then variation in (θ, φ) corresponding to these variations is obtained as follows from equation (6).

$$\Delta\theta(u', \phi) = \left\{\tan^{-1}\left(\frac{u' + \Delta u}{f\cos\phi}\right) - \tan^{-1}\left(\frac{u'}{f\cos\phi}\right)\right\} \quad (9)$$

$$\Delta\phi(v') = \left\{\tan^{-1}\left(\frac{v' + \Delta v}{f}\right) - \tan^{-1}\left(\frac{v'}{f}\right)\right\}$$

Density distribution of data on the polar coordinates is preferably as uniform as possible. If the density is non-uniform, information amount assigned will differ in accordance with angular range. Also, if the density distribution is in non-uniform, an unnecessarily large amount of data may be saved for a particular angular range, which means that memory usage efficiency is impaired. Δu and Δv can therefore be defined as follows, for example.

$$\Delta\theta(\phi) \equiv \max_{u'}\{\Delta\theta(u', \phi)\} = \tan^{-1}\left(\frac{\Delta u}{f\cos\phi}\right), \quad (10)$$

$$\Delta\phi \equiv \max_{v'}\{\Delta\phi(v')\} = \tan^{-1}\left(\frac{\Delta v}{f}\right)$$

Based on these definitions, quantization angles for background information registration, $\theta_{mn} = m\Delta\theta(\phi_n)$, $\phi_n = n\Delta\phi$ (m and n are integers) can be determined.

Figure 9:
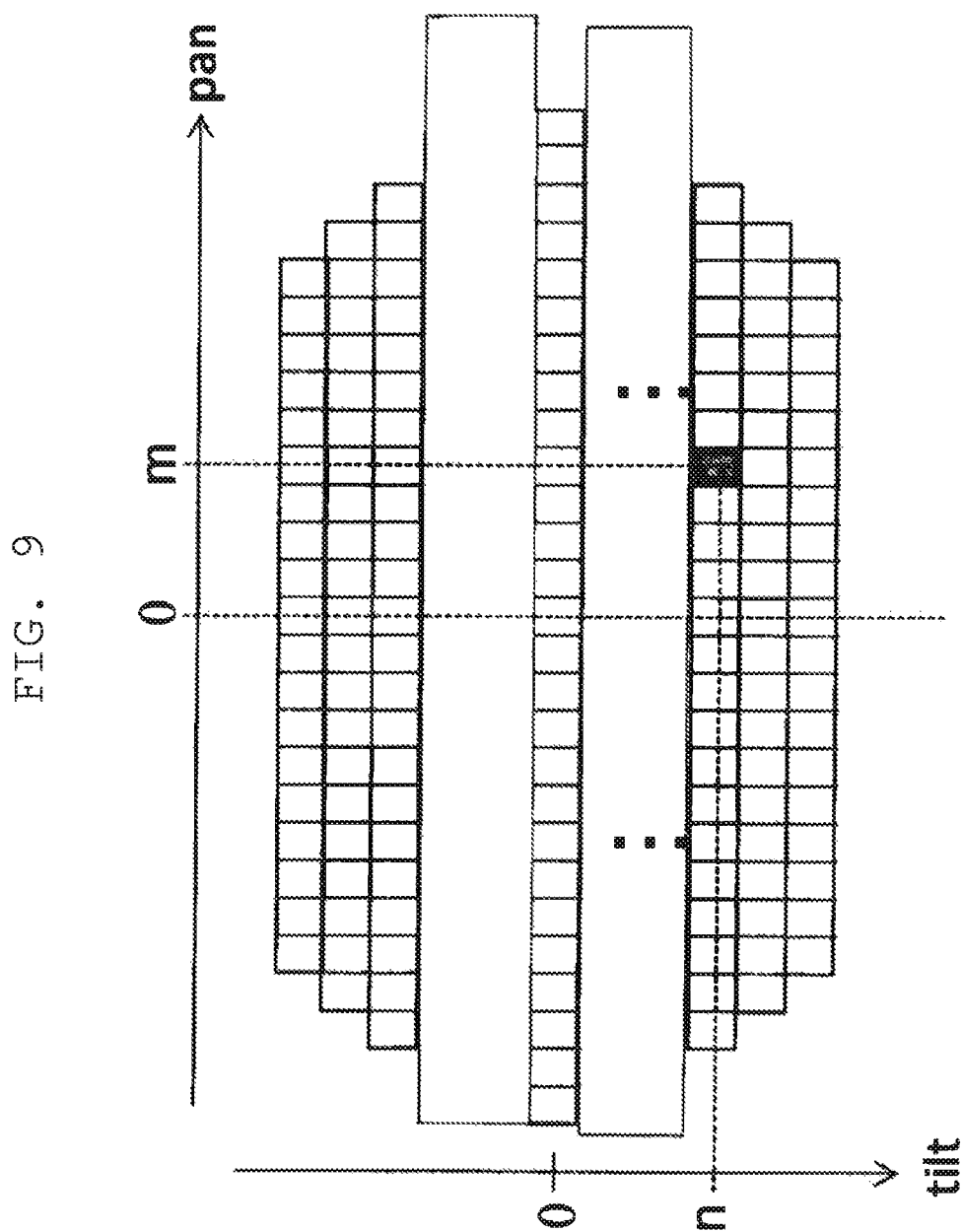
FIG. 9 is an explanatory drawing for describing polar coordinate information that has been quantized.

Here, m and n can be considered to be the amount of deviation from the reference direction (Z direction of the fixed coordinate system with the previously described example). The quantization angle therefore becomes wider as the extent of deviation of line of sight from the reference direction increases. As described previously, a schematic diagram of quantization units in the case where quantization has been performed is shown in FIG. 9. If tilt angle becomes large, pixel amounts to be assigned to each pan angle per unit increase, and so if quantization units are written at a fixed width a rectangular image is changed to "barrel shaped". In the previous equations, m and n could also take negative values. Also, depending on the definitions of Δu and Δv, at the time of background information registration there is a possibility that there will be no data belonging in a specified quantization angle range, but in this case it is preferable to avoid referencing of empty data by appropriately interpolating appropriate data.

(Step SB-4 in FIG. 5)

Next, the storage section 3 stores correspondence relationships between color information of pixels of the background image and polar coordinate information of those pixels. Here, the storage section 3 uses polar coordinate information that has been quantized by the quantization section 24 as the polar coordinate information of the pixels.

(Step SA-2 in FIG. 4)

Next actual image information is calculated. A procedure for actual image information calculation will be described with reference to the flowchart of FIG. 10.

Figure 10:
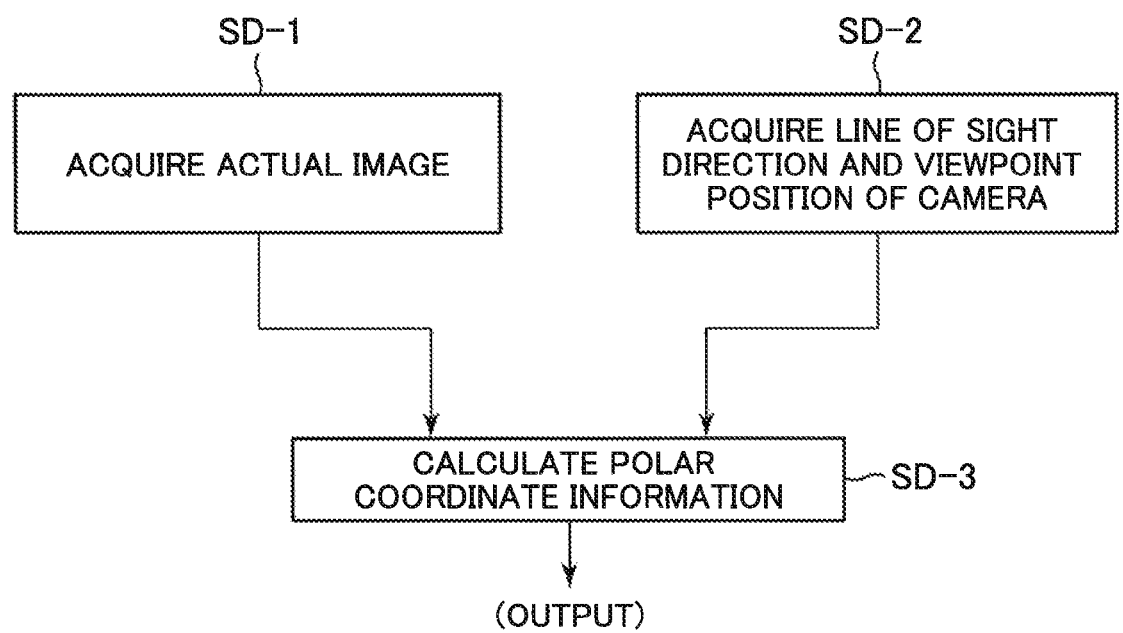
FIG. 10 is a flowchart showing a sequence for calculating information of an actual image.

(Step SD-1 in FIG. 10)

First, an actual image, being an image that contains a physical object, is acquired by the imaging section 1. The image acquisition method itself is the same as the case of the background image. However, in the case where a physical object is tracked by line of sight, it is preferable to carry out the following differential extraction processing per each actual image acquisition.

(Step SD-2 in FIG. 10)

On the other hand, line of sight direction and viewpoint position of the camera 11 are acquired by the line of sight direction acquisition section 21 and the viewpoint position acquisition section 22. This processing can also be the same as for the background image.

(Step SD-3 in FIG. 10)

Next, positional information of pixels of the actual image are converted by the coordinate conversion section 23 to polar coordinate information of the fixed coordinate system, using information on the line of sight direction and the viewpoint position of the camera 11. This coordinate conversion processing is also carried out in the same way as for the background image described previously. The polar coordinate information that has been acquired is sent to the target background extraction section 4.

(Step SA-3 in FIG. 4)

Next, the target background extraction section 4 specifies a background image in an angular region corresponding to the actual image as a target background, using polar coordinate information of pixels of the actual image. In more detail, the target background extraction section 4 can specify a background image in a region corresponding to a region where the actual image has been shot, based on polar coordinate information of the actual image (in actual fact, the polar coordinate information has been quantized). Accordingly, the target background extraction section 4 sends polar coordinate information for specifying a range corresponding to the actual image to the storage section 3, and it is possible to designate or acquire an image of a target background (namely pixel information) corresponding to that polar coordinate information.

(Step SA-4 in FIG. 4)

Next, the differential extraction section 5 extracts differentials between the actual image and the target background by comparing the actual image and the target background. Since the actual image and the target background correspond to images of the same region in real space (can be called the plane Π in FIG. 7(a)), extraction of background differentials can be carried out by comparing information (color information) associated with those pixels with each other.

Here, for the extraction of background differentials, there are a method of making pixel position on an image plane a reference (namely a method carried out within an image space), and a method of making pixel position on polar coordinates a reference (namely a method carried out within a polar coordinate space). In the case where pixel position on an image plane is made a reference, it is possible to compare corresponding pixels of the same pixel position as a reference, using a correspondence relationship between polar coordinates and pixel position on the image plane (this correspondence relationship is calculated at the time of polar coordinates calculation). On the other hand, in the case of making pixel position on polar coordinates a reference, it is possible to compare corresponding pixels to the same polar coordinates. As has been described above, with this embodiment, since the polar coordinate information has been quantized comparison is carried out for every quantized polar coordinate. In a case where extraction is carried out in an image space also, since polar coordinates are quantized, position information is consequently quantized.

When determining either a background or a physical object, as well as comparison in pixel units, determination that also uses pixel information peripheral to those pixels is considered appropriate. This is for the following reasons:

it is expected that pixel values will vary to a certain extent due to lighting flicker and camera noise;

it is expected that because of camera shake in the actual line of sight direction, rounding errors at the time of quantization, or various mechanical errors, some sort of difference will occur between the background image that has been extracted from the full field of view background and the actual background.

Therefore, when carrying out determination with polar coordinates as a reference, for example, comparing an actual image and a background image for all pixel values that have been registered on an area centered on polar coordinates $(\theta_{mn}, \varphi_n)$ corresponding to pixel positions of a subject, namely, $(\theta_{(m+k)(n+l)}, \varphi_{(n+l)})$ (here, |k| and |l|<about 2 to 3), to determine whether or not it is a background, is considered appropriate. In the case where determination uses coordinates on an image as a reference, it is possible to carry out differential extraction by calculating image coordinates corresponding to these polar coordinates. With this embodiment, in addition to object extraction using the previously described background differential, it is also possible to carry out object extraction using image features. Specifically, it is possible to determine object position with good accuracy using an AND condition of object extraction using background differential and object extraction using image features.

(Step SA-5 in FIG. 4)

Next, the differential extraction section 5 sends the acquired differential information (namely the positional information of the physical object) to a control section, not shown. The drive section 12 is controlled by the control section so that the line of sight direction of the camera 11 is trained on the position of the physical object. In this way it is possible to track the physical object with the camera 11. If each of the previously described processes is sufficiently high speed, it becomes possible to arrange a physical object that is moving substantially in the center of the camera image.

(Step SA-6 in FIG. 4)

It is possible to use a portion other than the differential that has been extracted by the differential extraction section as information representing the background (namely, background information). The differential extraction section 5 of this embodiment then sends the background information to the background update section 6. The background information includes position information of a portion corresponding to the background (with this example, polar coordinate information that has been quantized) and color information for pixels at that position. Using the background information, the background update section 6 can perform update with background pixel information in the storage section 3 by specifying with polar coordinate information. Since it is possible to update to the latest background information in this way, it is possible to improve extraction precision of the background differential. Update of the background information does not need to be carried out every time the background differential is extracted, and it is also possible to carry out the update every specified time interval. Alternatively, it is possible to omit update processing for background information using background differential extraction, and to reacquire and update all background information every fixed time, for example.

(Step SA-7 in FIG. 4)

Next, in the event that a new actual image has been acquired by the camera 11, step SA-2 is returned to and the previously described processing is repeated. If a new actual image has not been acquired, processing is completed.

According to the present embodiment, in a case of using a camera whose viewpoint moves, it becomes possible to carry out background differential extraction at high-speed and with good precision. For example, in a relay broadcast of a ballgame in real time, for example, it becomes possible to provide images that are always tracking the ball. There is the advantage that it is possible to provide images having new additional value, such as a movie that is always centered on the ball (for example, in table tennis, a movie as if a viewer is always viewing around behind the ball). The device of this embodiment can be considered to be applicable to various fields, such as medicine, factory automation and robot vision etc.

Second Embodiment

Next, a background differential extraction device of a second embodiment of the present invention will be described mainly with reference to FIG. 11. In the description of the second embodiment, structural elements that are basically common to the previously described background differential extraction device of the first embodiment will be assigned the same reference numerals, to avoid cumbersome description.

The device of the second embodiment differs from the device of the first embodiment in that a blur generating section 7 is additionally provided. The blur generating section 7 is a functional element for carrying out processing to generate a combined target background that has blur by specifying a plurality of the target backgrounds along a direction in which the line of sight direction moves, and combining the specified plurality of target backgrounds. Also, the differential extraction section 5 of the second embodiment extracts a differential by comparing the actual image and the combined target background. Further with this second embodiment, the background update section 6 is omitted and sequential background update is not carried out. Accordingly, a background image that is stored in the storage section 3 constitutes an image of an entire background that has been initially acquired (or alternatively, an image of the entire background that has been reacquired after that).

Motion blur (in this specification simply called "blur") is image shake arising as a result of the subject or the camera itself moving during exposure. If a tracking object is photographed so as to always be shot at a fixed position within an image, then large camera shake (specifically blur) arises in landscape portions even if exposure time is short, depending on the movement speed of the object. On the other hand, background pixel information that is stored in the storage section 3 is ordinarily assumed to be for a stationary condition, and so there is no blur in the background image. Accordingly, if this type of camera shake arises there is a problem in that accurately extracting a background differential generally becomes difficult. It is therefore considered to produce blur in the background image also, by image processing. However, conventionally proposed blur elimination using a blur kernel (reference literature: P. Hansen and J. N. D. O'leary: "Deblurring Images: Matrices, Spectra, and Filtering", SIAM Press (2006).) requires a large amount of computational effort, and so is ill-suited to being incorporated into real time systems. With this embodiment therefore "background images that include blur" are generated utilizing the condition that line of sight direction of the camera 11 is already known, and background differentiation is carried out.

A specific example of blur generation processing will be described in detail in the following.

(Blur Generation Processing)

Footage obtained from a camera is obtained as a sum of light that is incident on each image receiving element during exposure. Specifically, an image I(t) taken using an exposure of Δt seconds from time t can be expressed by the following equation.

$$I(t) = \int_t^{t+\Delta t} i(\theta_c(t), \varphi_c(t)) dt \quad (11)$$

Here, $i(\theta_c, \varphi_c)$ represents an image in the line of sight direction $(\theta_c, \varphi_c)$ when stationary. However, in a system installation $i(\theta_c, \varphi_c)$ is not acquired continuously but discretely, which means that it is possible to acquire $\hat{I}$ below as an estimated value, with a number of times of sampling during exposure set to n.

$$\hat{I}(t) = \frac{1}{n} \sum_{k=1}^{n} i(\theta_c[k], \phi_c[k]) \quad (12)$$

Here, $(\theta_c[k], \varphi_c[k])$ represents line of sight direction at a kth sampling time (time $t+(k/n)\Delta t$). This processing corresponds to the "processing to generate a combined target background $\hat{I}$ that has blur by specifying a plurality of the target backgrounds along a direction in which the line of sight direction moves, and combining the specified plurality of target backgrounds". As will be clear from the above description, if it is possible to determine line of sight direction at each time during exposure it is possible to generate background images that contain motion blur based on a full field of view background.

If it is possible to produce motion blur in a background image it can be expected that precision of differential extraction will be improved.

In the previously described blur generation processing, the number of images that are combined for blur generation can basically be determined by the movement speed of the line of sight. Specifically, a sampling interval for image acquisition and camera exposure time ΔtI are normally fixed, but among the images that have been acquired within the fixed exposure time Δt, how many of those images will be used to carry out blur generation can be determined by movement speed of the line of sight. For example, when line of sight movement speed is low, it can be considered to use not all of the images that have been acquired within Δt in the combination, but to thin out the images to a certain extent. In this way it is possible to change the number of images used in blur generation depending on the line of sight movement speed.

The remaining structure and advantages of the device of the second embodiment are the same as those of the first embodiment described previously, and so more detailed description is omitted.

The content of the present invention is not limited to each of the described embodiments. Various modifications are possible to the basic structure of the present invention, within the scope described in the patent claims.

For example, each of the above-described structural elements can exist as a functional block, and may not necessarily exist as independent hardware. Also, as a method of implementation, it is possible to use hardware or to use computer software. Further, a single functional element of the present invention may be realized as a set of a plurality of functional elements, and a plurality of functional elements of the present invention may be implemented by a single functional element.

Also, functional elements may be located at positions that are physically separated from one another. In this case, corresponding functional elements may be connected by means of a network. Functions may be realized by means of grid computing or cloud computing, and alternatively functional elements may also be constituted by means of grid computing or cloud computing.

Further, in the previously described embodiments, an example has been described where camera viewpoint is moved using a so-called Saccade mirror, but this is not limiting, and the present invention may be applied to any device as long as it is a camera whose viewpoint can be moved.

The invention claimed is:

1. A device for extracting background differentials using images that have been acquired by a camera whose line of sight direction and viewpoint position are movable, comprising:
    an imaging section, a polar coordinate calculation section, a storage section, a target background extraction section, a control section, and a differential extraction section, wherein
        the imaging section comprises a camera and a drive section,
        the camera is configured to be able to acquire a background image, being an image that does not contain a physical object, or an actual image, being an image containing a physical object,
        the drive section is configured to be able to change line of sight direction and viewpoint position of the camera,
        the polar coordinate calculation section further comprises a line of sight direction acquisition section, a viewpoint position acquisition section, and a coordinate conversion section,
        the line of sight direction acquisition section acquires a line of sight direction of the camera,
        the viewpoint position acquisition section acquires a viewpoint position of the camera,
        the coordinate conversion section converts positional information of pixels of the background image or the actual image to polar coordinate information of a fixed coordinate system, using the line of sight direction and viewpoint position that have been acquired,
        the storage section stores correspondence relationships between color information of pixels of the background image and polar coordinate information of those pixels,
        the target background extraction section identifies the background image, in an angle region corresponding to the actual image, as a target background, using polar coordinate information of pixels of the actual image,
        the differential extraction section extracts differentials between the actual image and the target background by comparing the actual image and the target background to acquire positional information of the physical object,
        the differential extraction section sends the positional information of the physical object to the control section, and
        the control section controls the drive section using the positional information to train the line of sight direction of the camera on the physical object.

2. The background differential extraction device of claim 1, wherein the conversion to the polar coordinate information by the coordinate conversion section comprises:
    processing to convert positional information of pixels of the background image or the actual image to virtual position information, being positional information of those pixels on a virtual image of a virtual camera whose viewpoint is fixed, and
    processing to convert the virtual positional information to polar coordinate information in the fixed coordinate system.

3. The background differential extraction device of claim 1, further comprising a quantization section, and wherein:
    the quantization section quantizes the polar coordinate information that has been acquired by the coordinate conversion section,
    and the quantization section also increases an angular range as quantization units the more the line of sight direction of the camera deviates from a reference direction of the fixed coordinate system, and
    the storage section uses the polar coordinate information that has been quantized as polar coordinate information of the pixels.

4. The background differential extraction device of claim 1, further comprising a blur generating section, and wherein
    the blur generating section generates a combined target background that has blur by specifying a plurality of target backgrounds along a direction in which the line of sight direction moves, and combining the specified plurality of target backgrounds, and the differential extraction section extracts the differentials by comparing the actual image and the combined target background.

5. The background differential extraction device of claim 1, wherein the line of sight direction of the camera is represented by a pan direction angle and a tilt direction angle.

6. The background differential extraction device of claim 1, wherein the drive section comprises a specular optical system that changes the line of sight direction of the camera in a pan direction and a tilt direction.

7. The background differential extraction device of claim 1, further comprising a background update section, and wherein
the background update section specifies a portion within the actual image, where the differential has not been extracted by the differential extraction section, as a new background image, and updates color information of pixels of the background image in the storage section.

8. A background differential extraction method, for extracting background differentials using images that have been acquired by a camera whose line of sight direction and viewpoint position are movable, comprising:
a step of acquiring a background image, being an image that does not contain a physical object, using the camera,
a step of converting positional information of pixels of the background image to polar coordinate information of a fixed coordinate system, using information on the line of sight direction and the viewpoint position of the camera,
a step of storing correspondence relationships between color information of pixels of the background image and polar coordinate information of those pixels in a storage section,
a step of acquiring an actual image, being an image that contains a physical object, using the camera,
a step of converting positional information of pixels of the actual image to polar coordinate information of the fixed coordinate system, using information on the line of sight direction and the viewpoint position of the camera,
a step of identifying the background image, in an angle region corresponding to the actual image, as a target background, using polar coordinate information of pixels of the actual image,
a step of extracting differentials between the actual image and the target background by comparing the actual image and the target background to acquire positional information of the physical object, and
a step of controlling a drive section using the positional information to train the line of sight direction of the camera on the physical object.

9. A non-transitory computer-readable medium storing a computer program for extracting background differentials using images that have been acquired by a camera whose line of sight direction and viewpoint position are movable, the computer program causing a computer to execute:
a step of acquiring a background image, being an image that does not contain a physical object, in the camera,
a step of converting positional information of pixels of the background image to polar coordinate information of a fixed coordinate system, using information on the line of sight direction and the viewpoint position of the camera,
a step of storing correspondence relationships between color information of pixels of the background image and polar coordinate information of the pixels in a storage section,
a step of acquiring an actual image, being an image that contains a physical object, in the camera,
a step of converting positional information of pixels of the actual image to polar coordinate information of the fixed coordinate system, using information on the line of sight direction and the viewpoint position of the camera,
a step of identifying the background image, in an angle region corresponding to the actual image, as a target background, using polar coordinate information of pixels of the actual image,
a step of extracting differentials between the actual image and the target background by comparing the actual image and the target background to acquire positional information of the physical object, and
a step of controlling a drive section using the positional information to train the line of sight direction of the camera on the physical object.

* * * * *